United States Patent
Shin et al.

(10) Patent No.: US 10,108,635 B2
(45) Date of Patent: Oct. 23, 2018

(54) DEDUPLICATION METHOD AND DEDUPLICATION SYSTEM USING DATA ASSOCIATION INFORMATION

(71) Applicant: SAMSUNG ELECTRONICS CO., LTD., Suwon-si, Gyeonggi-Do (KR)

(72) Inventors: Hyun-Jung Shin, Yongin-si (KR); Ju-Pyung Lee, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 466 days.

(21) Appl. No.: 14/558,199

(22) Filed: Dec. 2, 2014

(65) Prior Publication Data

US 2015/0154221 A1     Jun. 4, 2015

(30) Foreign Application Priority Data

Dec. 3, 2013 (KR) .......................... 10-2013-0149469

(51) Int. Cl.
    *G06F 17/30*     (2006.01)

(52) U.S. Cl.
    CPC .............................. *G06F 17/30159* (2013.01)

(58) Field of Classification Search
    CPC ...................... G06F 17/30159; G06F 11/1453
    USPC ........................................................ 707/692
    See application file for complete search history.

(56) References Cited

U.S. PATENT DOCUMENTS

| | | | |
|---|---|---|---|
| 7,640,262 B1 * | 12/2009 | Beaverson et al. | |
| 7,984,026 B2 * | 7/2011 | Iitsuka | 707/692 |
| 7,996,371 B1 | 8/2011 | Deshmukh | |
| 8,055,618 B2 | 11/2011 | Anglin | |
| 8,140,491 B2 | 3/2012 | Mandagere et al. | |
| 8,407,193 B2 | 3/2013 | Gruhl et al. | |
| 8,447,741 B2 | 5/2013 | Reiter et al. | |
| 9,514,003 B2 * | 12/2016 | Fukui | 707/692 |
| 2010/0088277 A1 | 4/2010 | Rao et al. | |
| 2011/0184908 A1 | 7/2011 | Slater et al. | |
| 2012/0158675 A1 | 6/2012 | Gupta et al. | |
| 2012/0166401 A1 | 6/2012 | Li et al. | |
| 2013/0151484 A1 | 6/2013 | Kruglick | |
| 2014/0122818 A1 * | 5/2014 | Hayasaka et al. | 711/162 |

FOREIGN PATENT DOCUMENTS

JP      2012-533126      12/2012

OTHER PUBLICATIONS

Ahmed El-Shimi et al., Primary Data Deduplication—Large Scale Study and System Design, Jun. 2012, Proc. USENIX ATC, 1-12.*

* cited by examiner

*Primary Examiner* — Jean B Fleurantin
(74) *Attorney, Agent, or Firm* — F. Chau & Associates, LLC

(57) ABSTRACT

A deduplication method using data association information includes extracting information about a target file and at least one reference file associated with the target file as association information before duplication determination is performed. The at least one reference file is identified by the association information as a comparison target set for comparison when the duplication determination of the target file is performed. The duplication determination is performed with the target file with respect to the at least one reference file in the selected comparison target set.

11 Claims, 8 Drawing Sheets

DEDUPLICATION METHOD AND DEDUPLICATION SYSTEM USING DATA ASSOCIATION INFORMATION

CROSS-REFERENCE TO RELATED APPLICATIONS

This application claims priority to Korean Patent Application No. 10-2013-0149469, filed on Dec. 3, 2013 in the Korean Intellectual Property Office, the disclosure of which is incorporated by reference herein in its entirety.

TECHNICAL FIELD

The present inventive concept relates to data deduplication technology, and more particularly to a method for data deduplication using associated information and a system for using the same.

DISCUSSION OF THE RELATED ART

Data deduplication is a type of storage technology for efficiently using storage space by determining whether data to be stored in a storage device is a duplicate of data that has already been stored in the storage device. If it is determined that the data to be stored is a duplicate of the data already stored, a link to the data already stored may be used without storing the data to be stored in the storage device for a second time. Typically, determining whether data to be stored is duplicate is performed through comparison of hash indexes of the data.

Deduplication may be conceptualized as either file-level deduplication or block-level deduplication, depending upon a deduplication level. File-level deduplication generates and compares hash indexes in the unit of a file. In this case, even if only a part of a file is changed, the file is recognized as a different file, the entire different file is stored in the memory device along with the original version, even though there may be substantial overlap in content, and thus the storage efficiency is lowered.

Block-level deduplication divides a file into a plurality of blocks, which may be chunks of data, by chunking the file in the unit of, for example, 512 bytes to several kilobytes (KB), and then generates and compares hash indexes in the unit of a chunk. In this case, since duplication is determined for each chunk that corresponds to a part of the file, the duplication can be found in the case where only a part of the file is changed. Then only those chunks that have been changed need be stored within the memory device, and thus the storage efficiency is heightened. In this case, however, each chunk is compared with all the data already stored in order to determine the duplication.

When using block-level deduplication, if a large amount of data has already been stored, the amount of comparison information (e.g., hash indexes) that is used to perform the duplication determination is increased. Modern storage devices may be capable of storing terabytes and even petabytes of data. These large storage capacities increase the time required to perform the duplication determination.

SUMMARY

Exemplary embodiments of the present inventive concept provide a deduplication method and a deduplication system, which can select a relatively small comparison target set based on data association information and use the selected comparison target set to perform data duplication determination.

Additional aspects and features of the present inventive concept are described below.

In one aspect of the present inventive concept, there is provided a deduplication method using data association information. The method includes extracting information about a target file and at least one reference file associated with the target file as association information during a period measured from a time when the target file is generated to a time when duplication determination is performed. The at least one reference file recognized by the association information as a comparison target set for comparison is selected when the duplication determination of the target file is performed. The duplication determination is performed with the target file with respect to the at least one reference file in the selected comparison target set.

According to an aspect of the present inventive concept, there is provided a deduplication system using data association information. The system includes an association information generator extracting information about a target file and at least one reference file associated with the target file as association information during a period measured from a time when the target file is generated to a time when duplication determination is performed. A reference loader selects the at least one reference file recognized by the association information as a comparison target set for comparison when the duplication determination of the target file is performed. A deduplicator performs the duplication determination with the target file with respect to the at least one reference file in the selected comparison target set.

According to an exemplary embodiment of the present inventive concept, since only the relatively small comparison target set is selected on the basis of the data association information and is used to perform the data duplication determination, the data deduplication can be efficiently performed.

Exemplary embodiments of the present inventive concept provide a method for deduplicating data in a memory system. An instruction to copy or rename a first file in the memory system to a second file in the memory system is identified. An indicia of the copying as metadata is stored within the second file. Deduplication is performed within the memory system to determine if identical data is stored in multiple locations within the memory system by comparing hash values. In performing deduplication, the indicia stored in the second file is used to assign a higher priority to data being duplicate within the first and second file.

BRIEF DESCRIPTION OF THE DRAWINGS

The above and other objects, features and aspects of the present inventive concept will be more apparent from the following detailed description taken in conjunction with the accompanying drawings, in which.

DETAILED DESCRIPTION OF THE DRAWINGS

Figure 1:
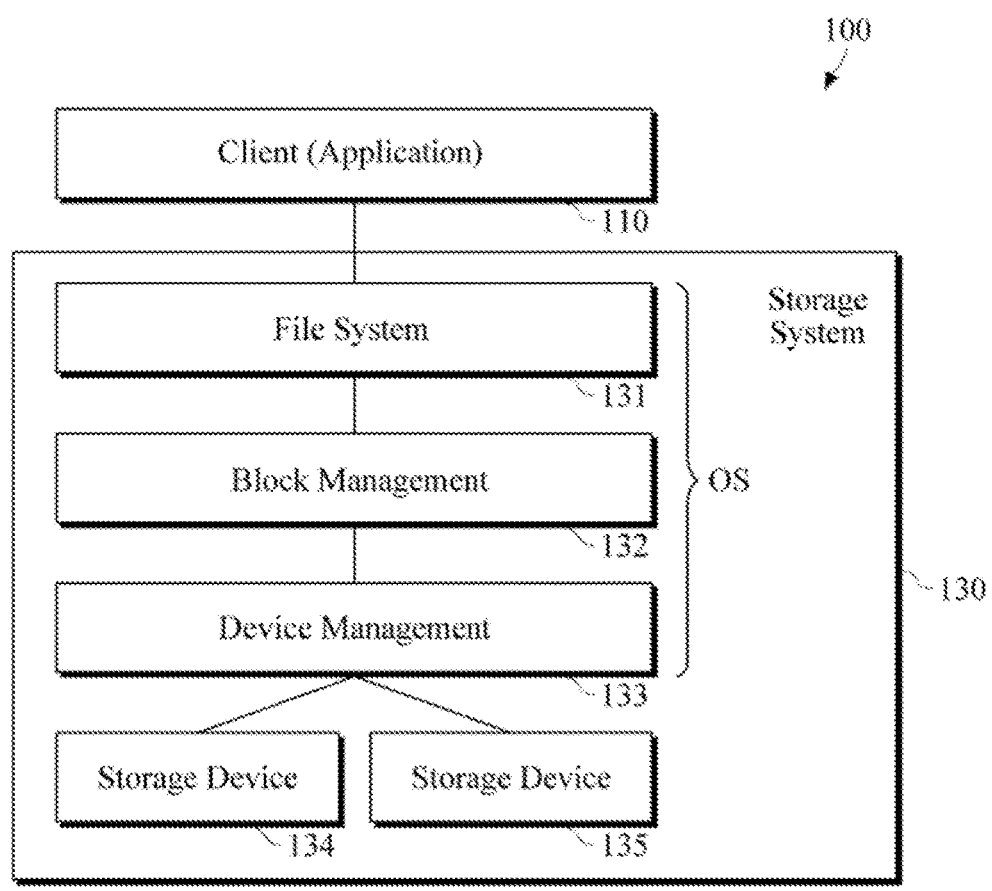
FIG. 1 is a block diagram illustrating an example of an integrated storage system in which a single storage system is connected to an application system.

Aspects and features of the present inventive concept and methods of accomplishing the same may be understood more readily by reference to the following detailed description of various exemplary embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art. Like reference numerals may refer to like elements throughout the specification.

It will be understood that when an element or layer is referred to as being "on", "connected to" or "coupled to" another element or layer, it can be directly on, connected or coupled to the other element or layer or intervening elements or layers may be present. As used herein, the term "and/or" includes any and all combinations of one or more of the associated listed items.

Exemplary embodiments of the present inventive concept are described herein with reference to cross-section illustrations that are schematic illustrations of idealized structures. As such, variations from the shapes of the illustrations as a result, for example, of manufacturing techniques and/or tolerances, are to be expected. Thus, the present inventive concept should not be construed as limited to the particular shapes of regions illustrated herein.

Single storage systems and/or distributed storage systems may be able to store terabytes and even petabytes of data. In such a large-capacity data storage systems, deduplication technology has an important task to reduce time required for duplication determination. For example, if only a relatively small comparison target set is selected and used to determined data duplication, time required for the duplication determination could be reduced.

For example, a deduplication technology to select only a relatively small comparison target set may use file position information that is path information. According to this technology, since only files that are stored in the same folder are selected rather than files that are stored over the whole storage, and duplication determination is performed only with respect to blocks of the selected files, the amount of information being compared remains relatively small when the duplication determination is performed. This approach may be effective in the case where updating occurs little-by-little, such as is the case with a backup solution. However, where a new file is added, and/or where the same file is duplicately stored in several folders, this approach may not be particular effective.

According to an exemplary embodiment of the present inventive concept, a block-level deduplication technology may use information such as a file type in file metadata. However, the original file metadata is information limited to the corresponding file. The file metadata might not include information establishing association between a specific file and other files. The possibility that different files of the same file type include the same data might not be known through the file metadata.

For example, documents prepared by a particular program may have a single file type. Further, in a storage system of an enterprise, a relatively large amount of documents of that particular type may be stored. In this case, if a comparison target set is selected on the basis of the file type, the number of files (e.g., files having the same file extension) in the selected comparison target set may be relatively large. Further, the association indicating which documents having the particular file type have duplicate data might not be known from the file type itself. In the case where the files that belong to the same file type are selected as the comparison target set for duplication determination, the size of the comparison target set may still be large, and thus it may take a long time to find the duplicate data and the deduplication may be inefficient.

Hereinafter, a deduplication method and a deduplication system using data association information according to an exemplary embodiment of the present inventive concept will be described with reference to the drawings.

Here, the association information according to an exemplary embodiment of the present inventive concept may be a kind of metadata, which can be simultaneously generated when data is generated and can be managed together with the data. The association information might not include the original metadata (legacy metadata) information, but may instead include information which is related to other reference data that is in association with the corresponding data. The original metadata may include various kinds of information about the corresponding data, for example, a data type, data generation means, purpose of data, data generation date, data preparer, position on a compute network where data is generated, and use standards. Typically, the original metadata is generated when the data is generated, and after being generated, the metadata is not changed. In contrast, in accordance with exemplary embodiments of the present inventive concept, after having been generated, association information may be changed and/or continuously corrected during a period measured from a data or file generation time to a duplication determination time.

Herein, the term "target" may be used to describe, either individually or collectively, data, data format, data type, metadata, a file, a block, a data lump and/or a data chunk.

Figure 2:
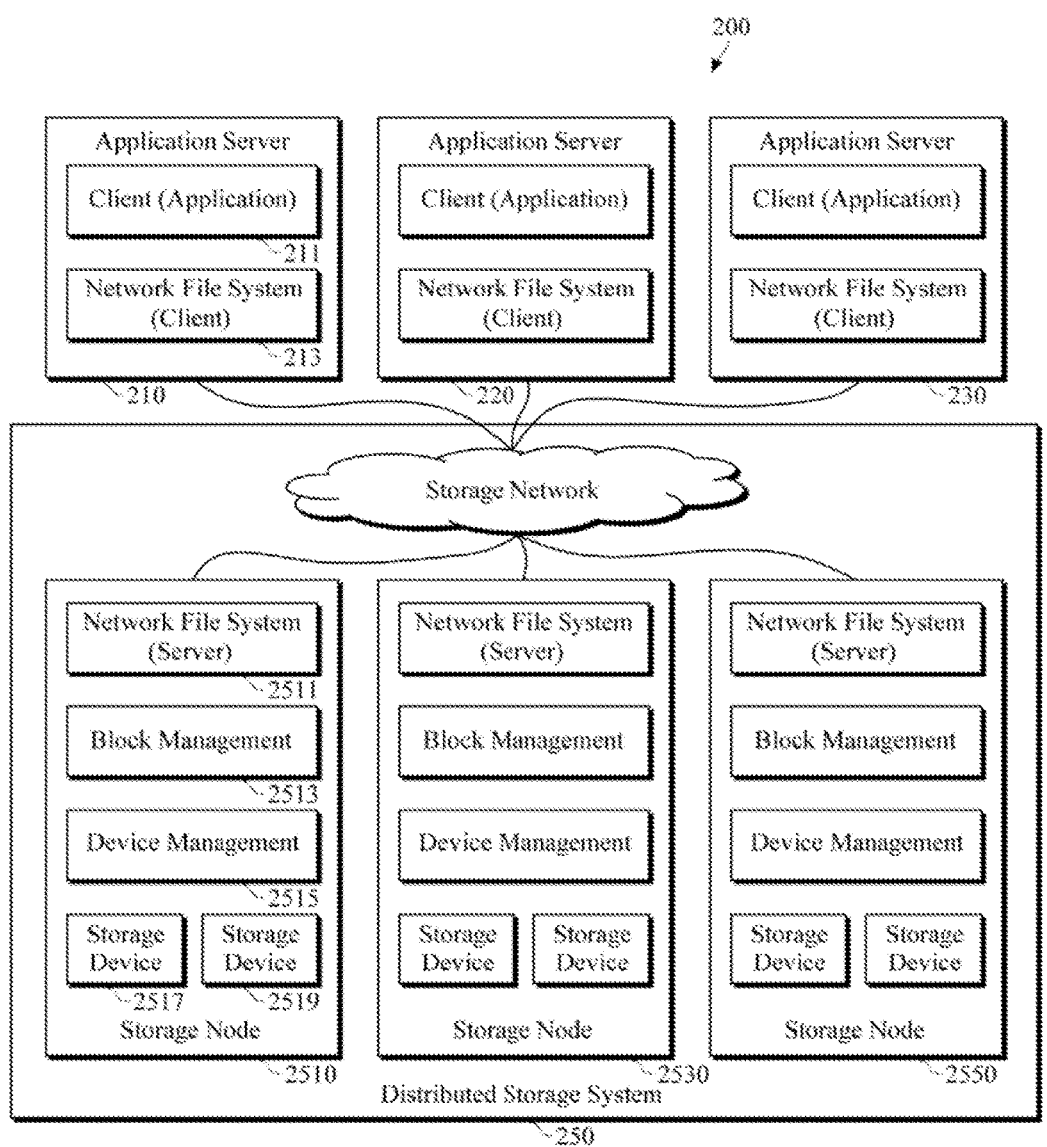
FIG. 2 is a block diagram illustrating an example of an extended integrated storage system including a distributed storage system in which a plurality of application servers and a plurality of storage nodes are connected through a storage network.

FIGS. 1 and 2 are schematic block diagrams explaining a configuration of a deduplication system using data association information according to an exemplary embodiment of the present inventive concept. According to an embodiment, a deduplication system may include a single storage system as illustrated in FIG. 1. Further, the deduplication system may include a plurality of storage systems in a distributed environment as illustrated in FIG. 2.

FIG. 1 is a block diagram illustrating an example of an integrated storage system in which a single storage system is connected to an application system.

An integrated storage system 100 may include a computing device, such as a desktop computer, a laptop computer, a tablet computer, a smart phone, or an embedded system in which an application system 110 and a single storage system 130 are connected through, for example, a system bus.

The integrated storage system 100 may optionally be implemented by a distributed computing system in which an application system 110 and a single storage system 130 are in communication with each other through a wired and/or wireless connection. In this case, the application system 110 may be a client device that may include a computing device, such as a desktop computer, a laptop computer, a tablet computer, a smart phone, or an embedded system. The storage system 130 may be a storage server device, such as a storage server, a network attached storage device, a RAID array or a cloud-based storage solution, which is connected to the application system 110 through a wide area network (WAN) such as the Internet or a local area network (LAN) such as a corporate intranet.

Data and/or files may be generated and used within the application system 110. In the application system 110, an operating system may be installed, and various applications, such as a word processor, productivity suite, web browser, and wire/wireless communication module, may also be installed.

As exemplified in FIG. 1, the storage system 130 stores data and/or files, and may include components such as a file system 131, a block management unit 132, a device management unit 133, and one or more storage devices 134 and 135. The file system 131 may process and manage files received from the application system 110, and may implement a main part of a deduplication function according to an exemplary embodiment of the present inventive concept. The block management unit 132 may divide a file into several blocks, and may process and manage the divided blocks. The device management unit 133 may manage the storage devices 134 and 135. The storage devices 134 and 135 may be media that store files and/or blocks. In the drawing, only two storage devices 134 and 135 are shown. However, the number of storage devices may be increased or decreased as desired without departing from the spirit of the present inventive concept. The file system 131, the block management unit 132, and the device management unit 133 may be parts of an operating system (OS).

FIG. 2 is a block diagram illustrating an example of an extended integrated storage system including a distributed storage system in which a plurality of application servers and a plurality of storage nodes are connected through a storage network.

Referring to FIG. 2, an extended integrated storage system 200 includes a plurality of application servers 210, 220, and 230 and a distributed storage system 250. The distributed storage system 250 may be formed by connecting a plurality of storage nodes 2510, 2530, and 2550 through a storage network. In the drawing, three application servers 210, 220, and 230 and three storage nodes 2510, 2530, and 2550 are shown. However, the number of application servers and storage nodes may be increased or decreased according to various exemplary embodiment of the present inventive concept.

As seen in FIG. 2, each of the application servers 210, 220, and 230 may include an application system 211 and a client portion 213 of a network file system. The application system 211 may correspond to the application system 110 of FIG. 1. The client portion 213 of the network file system may transmit files or data, which are generated, corrected, and managed by the application system 211, to the distributed storage system 250.

Each of the storage nodes 2510, 2530, and 2550 of the distributed storage system 250 may include a server portion 2511 of the network file system, a block management unit 2513, a device management unit 2515, and storage devices 2517 and 2519. In a similar manner to the storage system 130 of FIG. 1, the distributed storage system 250 is a system for storing data and/or files, and may include an operating system and one or more storage devices 2517 and 2519. The operating system may include the server portion 2511 of the network file system, the block management unit 2513, and the device management unit 2515.

The server portion 2511 of the network file system may process and manage files that are received from the client portion 213 of the network file system of the application systems 210, 230, and 250. The main parts of the deduplication function according to an exemplary embodiment of the present inventive concept may be implemented together with the server portion 2511 of the network file system and the client portion 213 of the network file system of the application systems 210, 230, and 250. In the same manner as the block management unit 132 of FIG. 1, the block management unit 2513 may divide a file into several blocks, and may then process and manage the divided blocks. In the same manner as the device management unit 133 of FIG. 1, the device management unit 2515 may manage the storage devices 2517 and 2519. The storage devices 2517 and 2519 may be media that store files and/or blocks. In the drawing, only two storage devices 2517 and 2519 are shown. However, the number of storage devices in the storage node may be increased or decreased according to various exemplary embodiments of the present inventive concept.

Figure 3:
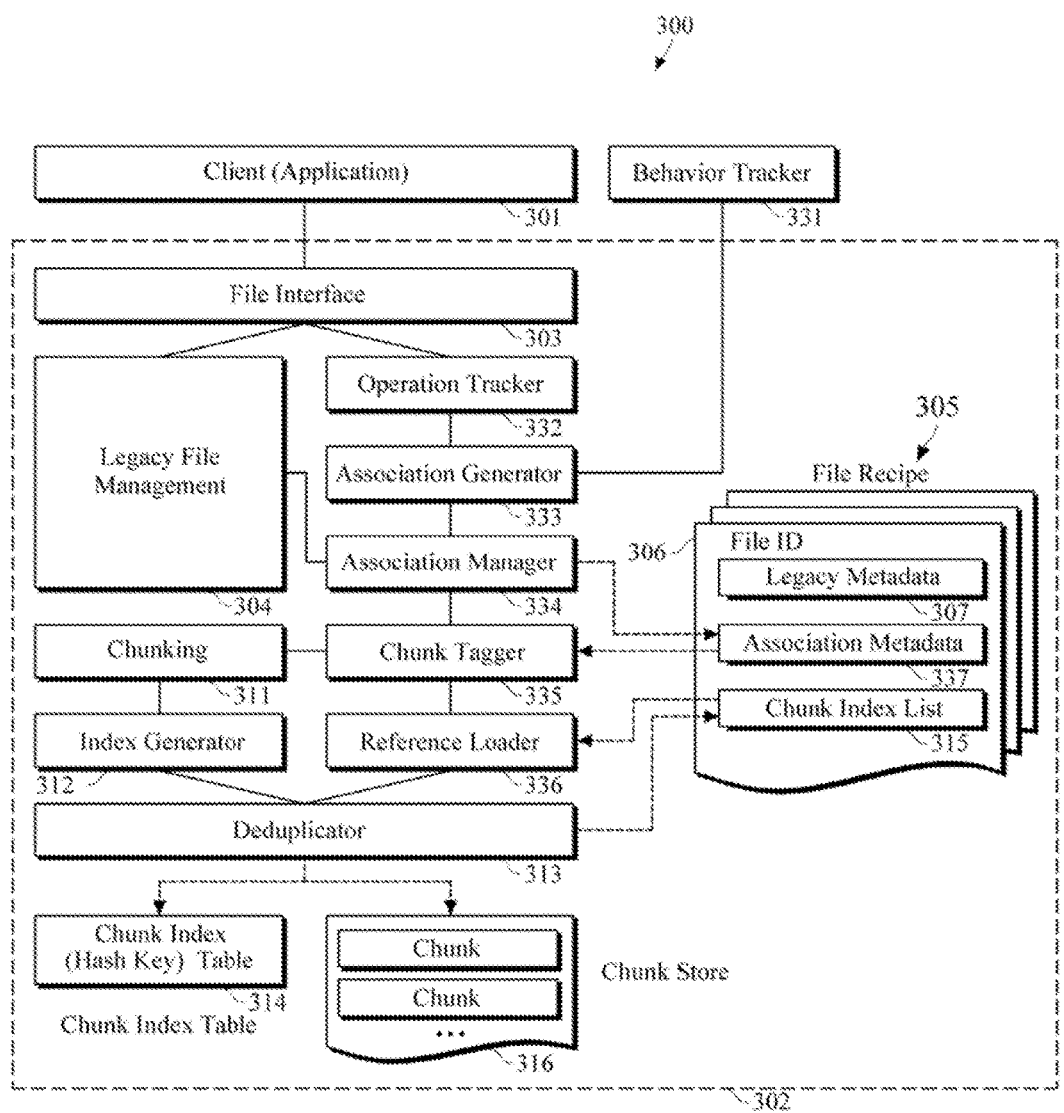
FIG. 3 is a block diagram illustrating the whole configuration of a deduplication system using data association information according to an exemplary embodiment of the present inventive concept.

FIG. 3 is a block diagram illustrating the whole configuration of a deduplication system using data association information according to an exemplary embodiment of the present inventive concept.

FIG. 3 illustrates, in more detail, the portion that is associated with the deduplication in the system 100 exemplified in FIG. 1. A deduplication system 300 implements a block-level deduplication technique. In the deduplication system 300, an application system 301 generates and corrects a file. A file system 302 receives and divides the file into a plurality of blocks and performs duplication determination in the unit of a block.

The file system 302 may include components for general file management, such as a file interface 303, a legacy file management unit 304, a file recipe 305, a file ID 306, and a legacy metadata 307. Further, the file system 303 may include components for performing a general block-level deduplication technique, such as a file chunker 311, an index generator 312, a deduplicator 313, a chunk index table 314, a chunk index list 315, and a chunk store 316.

Further, the application system 301 may further include a component, such as a behavior tracker 331, and the file system 303 may further include components, such as an operation tracker 332, an association information generator 333, an association information manager 334, a chunk tagger 335, a reference loader 336, and an association information metadata 337. These components may correspond to portions for generating, extracting, and using data association information according to an exemplary embodiment of the present inventive concept.

According to an exemplary embodiment of the present invention, the application system 301 may operate to generate and correct data or files through execution of various application programs. The application system 301 may transmit the file to the file system 302 of the storage system to store the file, for example, in the storage device. Before storing the file, the file system 302 may divide a file to be stored into a plurality of blocks and may then perform duplication determination in the unit of a block using, for example, the block-level deduplication technology. Here, the plurality of "blocks" that are generated through division of the file may be referred to as "chunks". The blocks/chunks may also be referred to as lumps of data.

The file interface 303 of the file system 302 receives a file from the application system 301. The legacy file management unit 304 may manage file metadata that is received together with the file or the file recipe 305 according to a general file related management algorithm. The file recipe 305 may include the file ID 306 and the legacy metadata 307. The file ID 306 is an ID that uniquely identifies the file. The legacy metadata 307 is the original file metadata that includes various kinds of information about the data, for example, a file generation date, purpose of the file, file type, file preparer, position on a compute network where data is generated, standards used, and/or file size or length, and resolution.

Further, according to exemplary embodiments of the present inventive concept, for the block-level deduplication technique, the file chunker 311 of the file system 303 may divide a received file in a predetermined unit size, which may be, for example, 512 bytes. The received file is thereby divided into a plurality of blocks, that is, a plurality of chunks. The index generator 312 generates chunk indexes as unique ID information for respective chunks. The chunk index may be a hash key that is made using, for example, a hash function. The generated chunk indexes may be generated and managed as a chunk index table 314 for each file. The chunk index list 315 may be added to the file recipe 305 to be managed. Respective chunks are managed by the chunk store 316. The deduplicator 313 may perform duplication determination with respect to the respective chunks through direct use of data in the chunks or indirect use of the chunk indexes.

When a user accesses the file through a user interface, the behavior tracker 331 may track the operation performed on the file by the user. For example, where a user issues a rename command using an input device, such as a keyboard or a mouse, for changing and storing a file name in a specific application, the user's action is transferred to the application through the user interface, and the application may perform the rename operation with respect to the file. In this example, the behavior tracker 331, which monitors the user's action through the user interface, can recognize that one file (e.g., "a.txt") is entirely copied and a new file (e.g., "a2.txt") is generated due to the user's rename action. As described above, since the behavior tracker 331 monitors the user's action through the user interface with respect to the specific file, it may find another file that is associated with the specific file and may generate the result as a file operation tracking log of the behavior tracker. In this way, it may be recorded that the new file a2.txt is likely to share data in common with the file a.txt.

The operation tracker 332 may track information about file processing that is requested through the file interface 303 in the file system 302. Since the operation tracker 332 monitors the operation through the file interface 303 with respect to the specific file, it may find another file that is associated with the specific file and may generate the result as a file operation tracking log of the operation tracker.

The association information generator 333 is a portion that extracts association information of a file. The association information is information about another file associated with a target file, that is, a reference file, during a period measured from a target file generation time to a duplication determination time. Multiple reference files may be associated with the single target file. The association information generator 333 may extract or generate the association information using the file operation tracking log that is generated by the behavior tracker 331 and/or the operation tracker 332.

The association information manager 334 may add the association information extracted by the association information generator 333 to the file metadata managed by the file system 302, for example, the file recipe 305. According to an exemplary embodiment of the present invention, as illustrated in FIG. 3, it can be seen that the association information is included as association information metadata 337. As an alternative, the association information manager 334 may manage and store the association information that is extracted by the association information generator 333 as a separate association information table rather than the file recipe 305. In this case, the separate association information table may have a similar structure to the file recipe 305, and may be managed by the file system 302 in a similar manner to the way in which the file system 302 manages the file recipe 305.

The chunk tagger 335 may tag the association information of the association information metadata 337 with the chunk generated by the file chunker 311.

The reference loader 336 selects reference files that appear to be associated in the association information of a target file and/or the association information that is tagged with the chunks of the target file as a comparison target set for comparison when the duplication determination is performed with respect to the target file and/or the chunks of the target file. Further, the reference loader 336 may investigate the file recipes 305 of the reference files in the comparison target set, bring the chunk index list 315, and transfer the chunk index list 315 to the deduplicator 313.

Figure 4A:
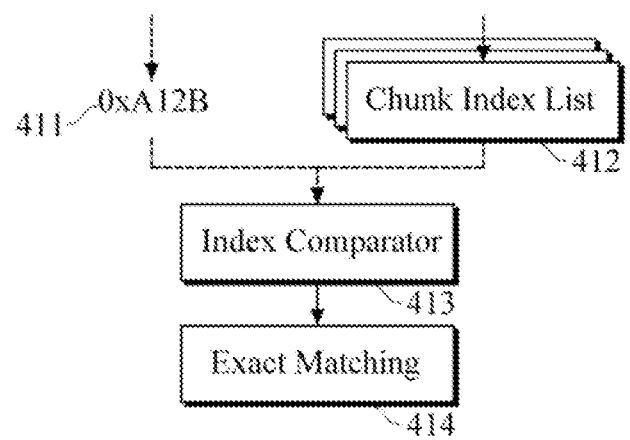
FIG. 4A is a block diagram illustrating an example of a duplication determination process through a deduplicator in a deduplication system using data association information of FIG. 3.
Figure 4B:
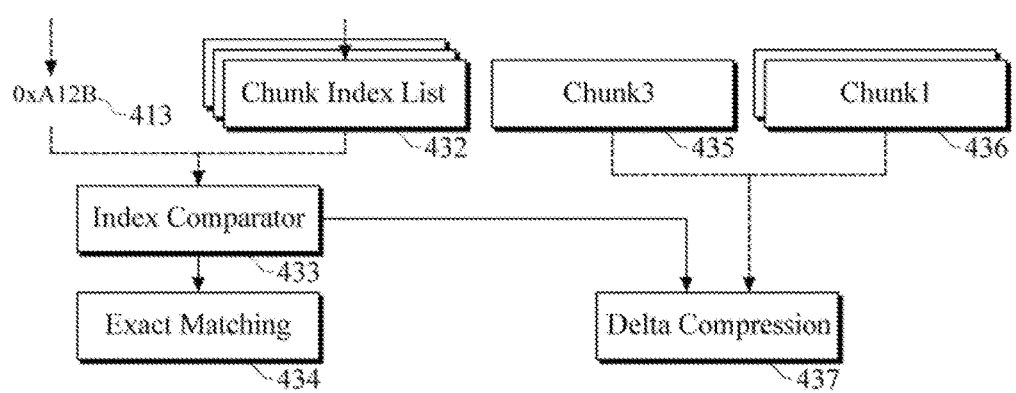
FIG. 4B is a block diagram illustrating an example of a duplication determination process through a deduplicator in a deduplication system using data association information of FIG. 3.
Figure 4C:
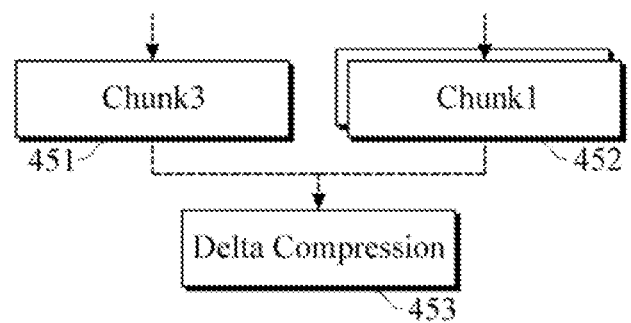
FIG. 4C is a block diagram illustrating an example of a duplication determination process through a deduplicator in a deduplication system using data association information of FIG. 3.

The deduplicator 313 may preferentially perform duplication determination with respect to the reference files in the selected comparison target set. The duplication determination of the deduplicator 313 may be performed in various ways. FIGS. 4A to 4C illustrate exemplary approaches for performing duplication determination in accordance with exemplary embodiments of the present inventive concept.

FIGS. 4A to 4C are block diagrams illustrating examples of a duplication determination process through a deduplicator in a deduplication system using data association information according to an exemplary embodiment of the present inventive concept.

FIG. 4A is a block diagram illustrating an example of a duplication determination process through a deduplicator in a deduplication system using data association information of FIG. 3. FIG. 4A shows an example of duplication determination using chunk indexes.

Referring to FIG. 4A, the deduplicator 313 may compare 413 a chunk index 411 of a target chunk, of which duplication determination is to be performed, with chunk indexes in chunk index lists 412 that are brought from reference files in a comparison target set. If there is a chunk index that accurately coincides with the chunk index 411 of the target chunk in the chunk index lists 412 of the reference file, it may be determined 414 that the chunk of the reference file that corresponds to the coincident chunk index has data identical to that of the target chunk that corresponds to the chunk index 411.

FIG. 4B is a block diagram illustrating an example of a duplication determination process through a deduplicator in a deduplication system using data association information of FIG. 3. FIG. 4B shows an example of duplication determination through direct comparison using chunk indexes on one side and using chunk data on the other side.

Referring to FIG. 4B, the deduplicator 313 may compare 433 a chunk index 431 of a target chunk 435, of which duplication determination is to be performed, with chunk index lists 432 that are brought from reference files in a comparison target set. If there is a chunk index that accurately coincides with the chunk index 431 of the target chunk in the chunk index lists 432 of the reference file, it may be determined 434 that the chunk of the reference file that corresponds to the coincident chunk index has data identical to that of the target chunk 435 that corresponds to the chunk index 431. In addition, the deduplicator 313 may directly compare data of the target chunk 435, of which duplication determination is to be performed, with data of the chunks 436 that are brought from the reference files in the comparison target set. Such comparison may be made using a delta compression technique 437.

FIG. 4C is a block diagram illustrating an example of a duplication determination process performed by a deduplicator in a deduplication system using data association information of FIG. 3. FIG. 4C shows an example of duplication determination through direct comparison of chunk data using a delta compression technique.

Referring to FIG. 4C, the deduplicator 313 may directly compare data of a target chunk 451, of which duplication determination is to be performed, with data of chunks 452 that are brought from the reference files in the comparison target set. Such comparison may be made using a delta compression technique 453.

According to an exemplary embodiment of the present inventive concept, the deduplicator 313 may perform the duplication determination by dividing a target file into a plurality of chunks (which may be referred to herein as "chunking") and comparing the chunk index of the chunk of the target file with chunk indexes of chunks of the reference file. Further, the deduplicator 313 may perform the duplication determination by comparing the data of the chunk of the target file with the data of the chunk of the reference file directly or by using the delta compression technique.

According to an exemplary embodiment, the duplication determination for comparing all the files with the target file is not performed, but a relatively small number of files are selected as the comparison target set for the preferential duplication determination. Further, the small number of files included in the comparison target set, that is, the reference files, may be selected based on association information that includes information about file operations performed on the associated files, such as rename, paste, and copy, from the time when the target file is generated.

Accordingly, there is a high possibility that the reference files in the selected comparison target set include the same data as the data of the target file, that is, the duplicate data. The deduplication system using data association information according to an exemplary embodiment preferentially performs the duplication determination with respect to the reference files in the comparison target set having a high possibility that the relatively small number of reference files include the duplicate data, and thus duplicate data may be promptly found.

Figure 5:
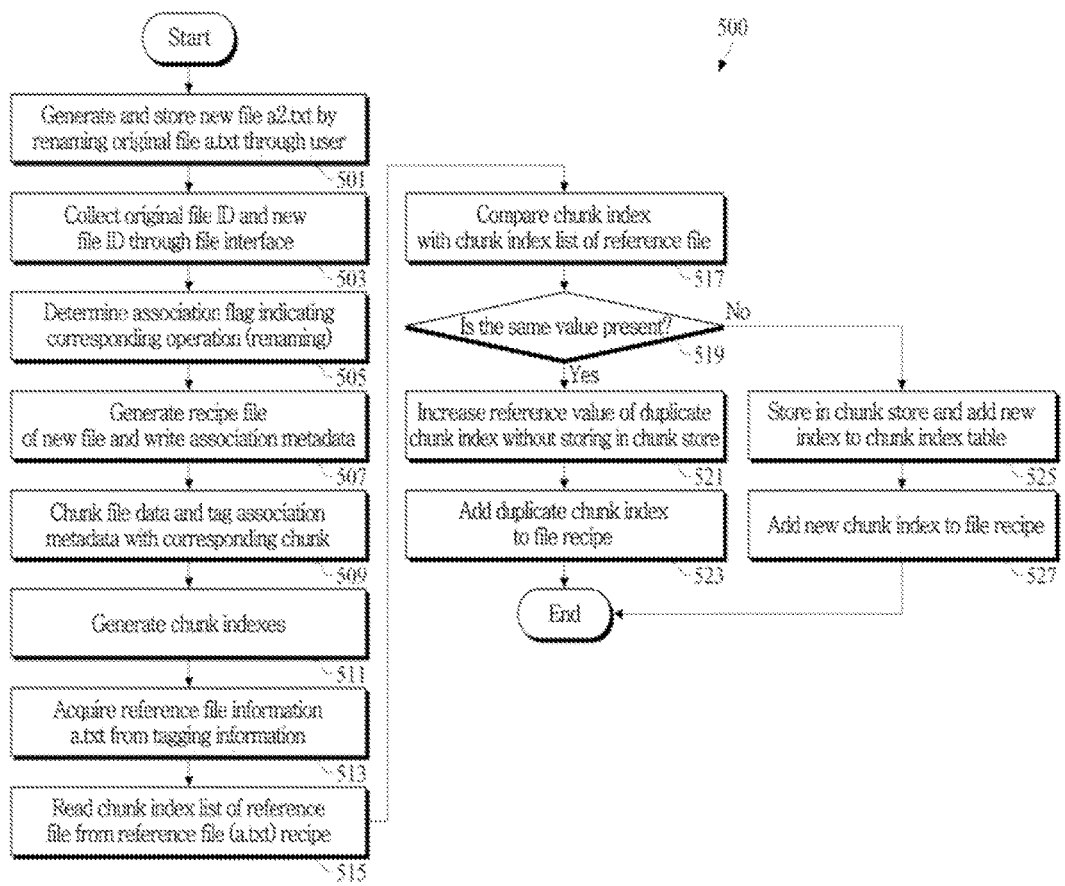
FIG. 5 is a flowchart illustrating a deduplication method using data association information according to an exemplary embodiment of the present inventive concept.

FIG. 5 is a flowchart illustrating a processes of deduplication using data association information according to an exemplary embodiment of the present inventive concept.

Referring to FIG. 5, a deduplication method 500 using data association information according to an exemplary embodiment of the present inventive concept will be described. In the illustrated example, a process that is performed when a user generates and stores a new file through renaming of the original file is described.

According to an exemplary embodiment of the present inventive concept, to copy the original file a.txt and change the file name through execution of a specific application, a user may input a rename command. In this case, the application generates a new file a2.txt that includes the data of the original file a.txt as it is, and then performs a file operation for storage (501).

If such a file operation is performed, file operation tracking logs may be generated by the operation tracker and/or the behavior tracker, which monitor the file operation. The association information generator can recognize the association relationship between the original file a.txt and the new file a2.txt by reading the file operation tracking logs.

In accordance with the recognized association relationship, the association information generator may collect file IDs of the original file and the new file (503).

Further, the association information generator may determine an association flag in accordance with the attribute of the file operation. For example, the association information generator may determine an association flag to be "FULL_COPY" that indicates the file operation in which the original file is entirely copied into the new file in accordance with the file rename action (505).

The determined association information flag, the original file ID, and the new file ID may be included in the association information of the generated new file. The association information of the generated new file may be stored in the form of file metadata, for example, as association information metadata, when the file recipe of the new file is generated (507).

Thereafter, a deduplication process starts, and the file chunker 311 chunks the new file a2.txt that is the target file into several chunks. The chunk tagger also tags the association information metadata of the new file according to the respective chunks (509).

Then, the index generator generates chunk indexes with respect to the respective chunks (511). The chunk index may include a hash key that is generated using a hash function. The chunk indexes may be used to uniquely identify the respective chunks.

The reference loader may recognize that the reference file that is associated with the new file a2.txt is the original file a.txt from the association information tagged with the respective chunks, and may acquire information about the associated original file (513).

The reference loader selects a file in the association information as the comparison target set for performing duplication determination with respect to the new file. The reference loader reads the chunk index list of the reference file from the file recipe of the reference file a.txt of the comparison target set (515). The chunk index list of the reference file that is read by the reference loader may be provided to the deduplicator.

Then, the deduplicator may compare the chunk index of the chunk of the new file with the chunk index list of the reference file (517). As exemplified in FIGS. 4A to 4C, the comparison process may include an indirect method for comparing the chunk indexes and/or a direct method for comparing the chunk indexes.

As the result of the comparison, it may be determined whether the chunk index of the chunk of the new file is present in the chunk index list of the reference file (519). For example, if the chunk index is "OxA12B," it may be determined whether the chunk index having the same value as this is present in the chunk index list of the reference file (519).

If the chunk index having the same value as the chunk index of the chunk of the new file is present in the chunk index list of the reference file (Yes, 519), then it is determined that the chunk that corresponds to the chunk index has the duplicate data.

Accordingly, the chunk of the new file that is determined to have the duplicate data is not stored in the chunk store, but the reference value of the corresponding chunk index is increased (521). Then, the chunk index of the chunk that is determined to have the duplicate data is added to the file recipe (523) to complete the process.

If the chunk index having the same value as the chunk index of the chunk of the new file is not present in the chunk index list of the reference file (No, 519), then it is determined that the chunk of the reference file that has the duplicate data to the new chunk corresponding to the chunk index is not found. Accordingly, the chunk of the new file that is determined not to have the duplicate data is stored in the chunk store, and is added to the chunk index table as a new index (525). Then, the chunk index of the chunk of the new file that is determined not to have the duplicate data is added to the file recipe (527) to complete the process.

As described above, according to a deduplication method 500 using data association information according to an exemplary embodiment of the present inventive concept, information about the associated reference files in relation to the file operation that is performed while the data of the target file is generated and corrected is tracked. The duplication determination may be performed with respect to the files in association with the reference files. Since the reference file is a file that is associated with the file operation to generate and correct the data of the target file, there is a high possibility that the reference file includes data that is a duplicate of the target file. Accordingly, if the duplication determination is performed with respect to the reference files, the accuracy of the duplicate data determination can be secured, and the performance of the deduplication can be heightened.

Figure 6:
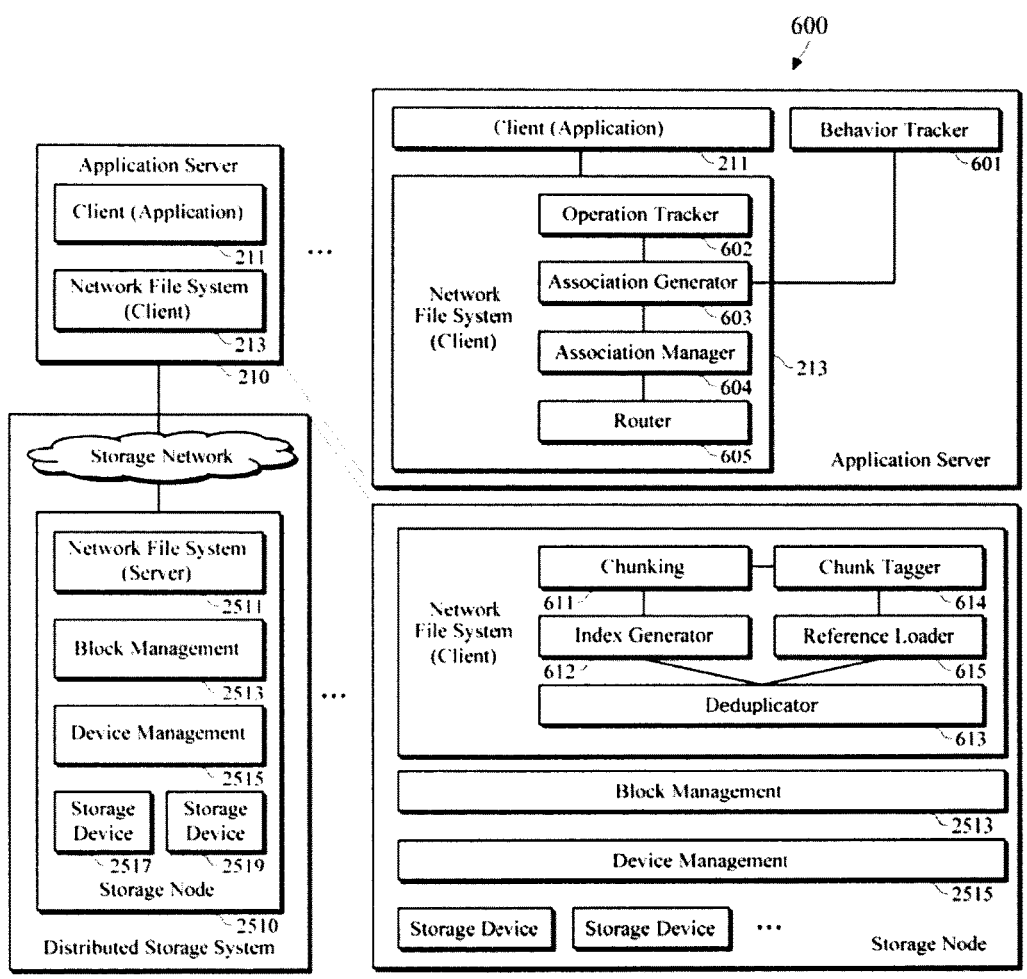
FIG. 6 is a block diagram illustrating an example of a deduplication system using data association information that can be implemented in a distributed computing environment according to an exemplary embodiment of the present inventive concept.

FIG. 6 is a block diagram illustrating an example of a deduplication system using data association information that can be implemented in a distributed computing environment according to an exemplary embodiment of the present inventive concept.

Referring to FIG. 6, the deduplication system 300 illustrated in FIG. 3 is applied to an extended system that includes the application server 210 and the distributed storage system 250.

The deduplication system 600 illustrated in FIG. 6 shows main parts of the deduplication function, according to an exemplary embodiment of the present invention, distributed to the server portion 2511 of the network file system and the client portion 213 of the network file system.

As illustrated, the client portion 213 of the network file system may extract and generate association information to include, for example, components storing in the file recipe as metadata. These components include a behavior tracker 601, an operation tracker 602, an association information generator 603, and an association information manager 604. In addition, the client portion 213 of the network file system may include a communication module, such as a router 605 for transmitting the file through a communication network.

The server portion 2511 of the network file system may include components that divide the file and perform duplication determination in the unit of a chunk. These components may include a file chunker 611, an index generator 612, a deduplicator 613, a chunk tagger 614, and a reference loader 615.

The roles and functions of the respective portions of the deduplication system 600 of FIG. 6 may be similar or identical to the roles and functions of the respective portions of the deduplication system 300 illustrated in FIG. 3. However, the deduplication system 600 of FIG. 6 is different from the deduplication system 300 illustrated in FIG. 3 in that main parts of the deduplication function are implemented to distribute to the server portion 2511 of the network file system and the client portion 213 of the network file system. Accordingly, a description of the similar portions is omitted and it may be assumed that to the extent that components have not been described with respect to FIG. 6, it may be assumed that these components are at least similar to corresponding components described above with respect to the previous figures.

Although exemplary embodiments of the present inventive concept have been described for illustrative purposes, those skilled in the art will appreciate that various modifications, additions and substitutions are possible, without departing from the scope and spirit of the invention.

What is claimed is:

1. A method for deduplication in a memory system using data association information, comprising:

extracting information about a target file and at least one reference file associated with the target file as association information before duplication determination is performed;

identifying the at least one reference file using at least the association information as a comparison target set for comparison;

performing the duplication determination with the target file with respect to the at least one reference file in the selected comparison target set; and performing deduplication on the target file and the at least one reference file when the performing of the duplication determination indicates that the target file and the at least one reference file are duplicates, wherein the association information includes an indicia of copying or renaming as metadata of the target file, and wherein the performing the duplication determination comprises:

dividing the target file into a plurality of chunks;

tagging the association information with respect to each of the divided chunks; and performing the duplication determination with respect to the chunks, with which the association information is tagged, of the reference file in the selected comparison target set using the association information, and wherein when duplication has been determined with respect to each of the chunks, only one copy of the duplicated chunk is stored into the memory system and other copies of the duplicated chunk are replaced with a link to a location within the memory system where the only one copy of the duplicated chunk is stored.

2. The method for deduplication of claim 1, wherein the extracting the information about the target file and at least one reference file comprises tracking a file operation that is performed by file processing through a file interface in a file system.

3. The method of claim 1, wherein the extracting the information about the target file and at least one reference file further comprises tracking a file operation that is performed by a user's action on a file through a user interface.

4. The method of claim 1, wherein the extracting the information about the target file and at least one reference file further comprises extracting the association information between files from a tracking log for a file operation.

5. A deduplication system using data association information, comprising:
an association information generator configured to extract information about a target file and at least one reference file associated with the target file as association information a performance of duplication determination;
a reference loader configured to identify the at least one reference file using at least the association information as a comparison target set for comparison;
a deduplicator configured to perform the duplication determination with the target file with respect to the at least one reference file in the selected comparison target set and to perform deduplication on the target file and the at least one reference file when the performing of the duplication determination indicates that the target file and the at least one reference file are duplicates;
a file chunker configured to divide the target file into a plurality of chunks; and
an index generator configured to generate chunk indexes for uniquely identifying the respective chunks that are chunked by the file chunker,
wherein the association information includes an indicia of copying or renaming as metadata of the target file,
wherein the deduplicator is configured to perform the duplication determination with respect to the chunk indexes of the reference file in the selected comparison target set using the association information about the chunk indexes of the each of the divided chunks, and
wherein the association information generator, the reference loader, the deduplicator, the file chunker, and the index generator include one or more processors, and
wherein when duplication has been determined with respect to each of the chunks, only one copy of the duplicated chunk is stored into a memory system and other copies of the duplicated chunk are replaced with a link to a location within the memory system where the only one copy of the duplicated chunk is stored.

6. The system of claim 5, further comprising an association information manager configured to add the association information extracted by the association information generator to file metadata managed by a file system and storing the added association information.

7. The system of claim 5, further comprising an association information manager configured to store the association information extracted by the association information generator such that a file system manages the association information as a separate association information table.

8. A method for deduplication in a memory system using data association information, comprising:
extracting information about a target file and at least one reference the associated with the target file as association information, the association information is metadata that includes a data type of the target file, data generation means used by the target file, purpose of data of the target file, data generation date of the target file, a data preparer for the target file, position on a computer network where data of the target file is generated, or use standards for the target data;
identifying the at least one reference file using at least the association information as a comparison target set for comparison;
dividing the target file into a plurality of chunks;
tagging the association information with respect to each of the divided chunks; and
performing duplication determination with respect to the chunks, with which the association information is tagged, of the reference file in the selected comparison target set using the association information; and
performing deduplication on the target file and the at least one reference file when the performing of the duplication determination indicates that the target file and the at least one reference file are duplicates, and
wherein when duplication has been determined with respect to each of the chunks, only one copy of the duplicated chunk is stored into the memory system and other copies of the duplicated chunk are replaced with a link to a location within the memory system where the only one copy of the duplicated chunk is stored.

9. The method for deduplication of claim 8, wherein the extracting the information about the target file and at least one reference file comprises tracking a file operation that is performed by file processing through a file interface in a file system.

10. The method of claim 8, wherein the extracting the information about the target file and at least one reference file further comprises tracking a file operation that is performed by a user's action on a file through a user interface.

11. The method of claim 8, wherein the extracting the information about the target file and at least one reference file further comprises extracting the association information between files from a tracking log for a file operation.

* * * * *